July 6, 1937.  L. H. MESSINGER, JR  2,085,818
ATTACHMENT FOR INTERNAL COMBUSTION ENGINES
Filed Aug. 19, 1933  3 Sheets-Sheet 1
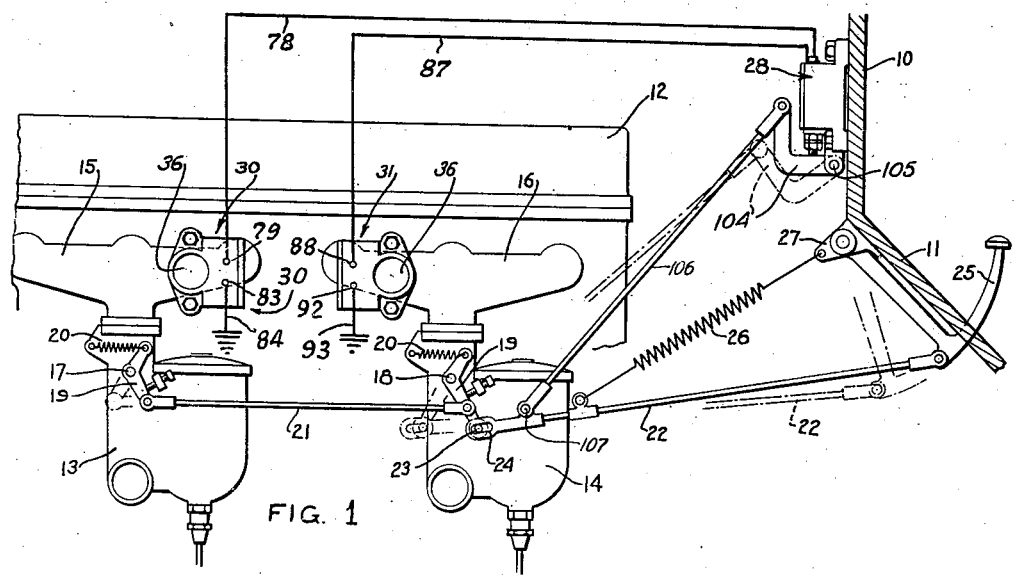
FIG. 1
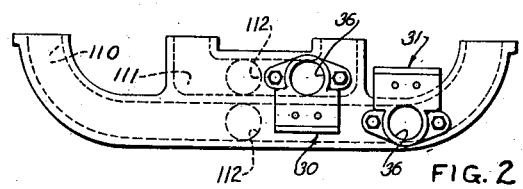
FIG. 2
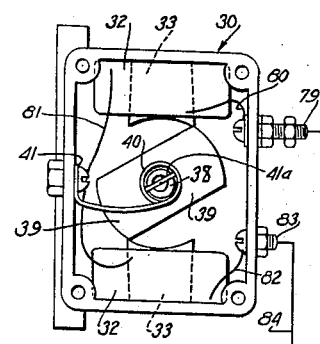
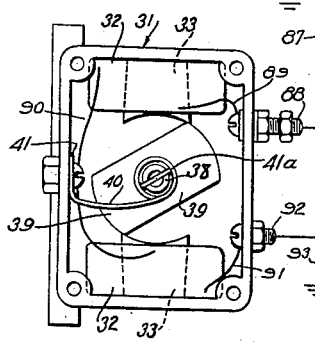
FIG. 3.
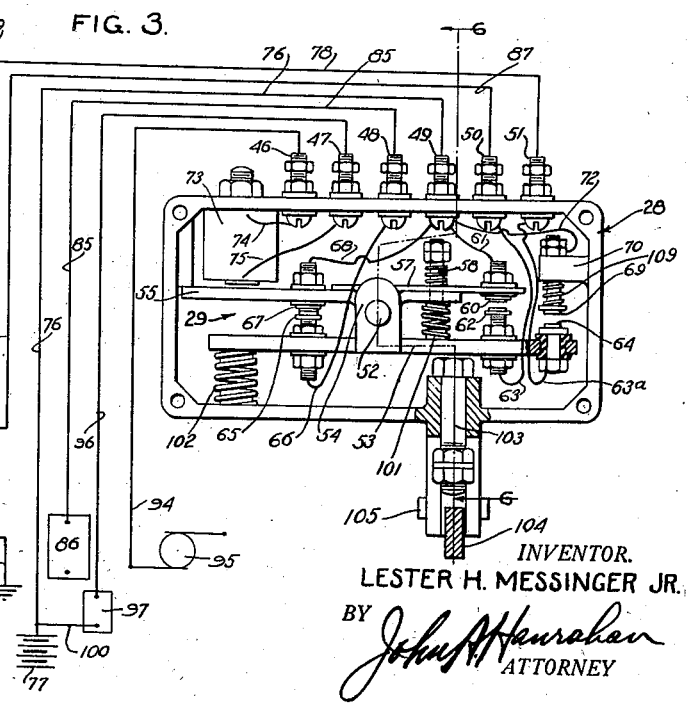
INVENTOR.
LESTER H. MESSINGER JR.
BY 
ATTORNEY INVENTOR.
LESTER H. MESSINGER JR.
BY John J. Hanrahan
ATTORNEY July 6, 1937.  L. H. MESSINGER, JR  2,085,818
ATTACHMENT FOR INTERNAL COMBUSTION ENGINES
Filed Aug. 19, 1933  3 Sheets-Sheet 3
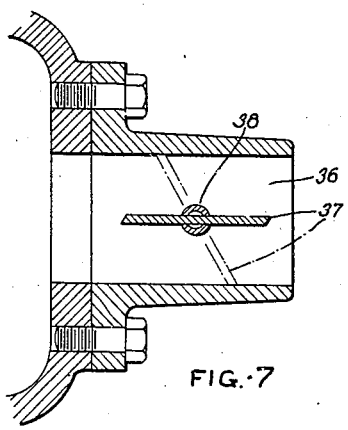
FIG. 7
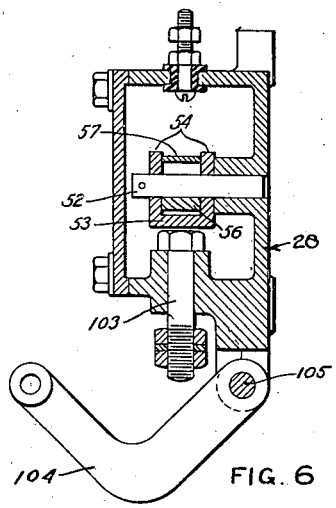
FIG. 6
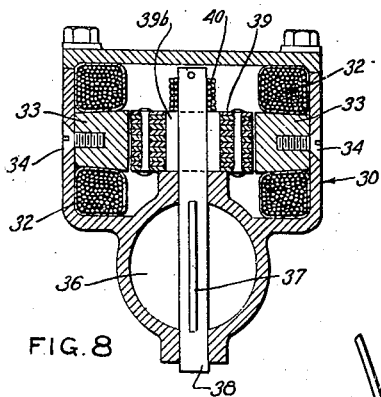
FIG. 8
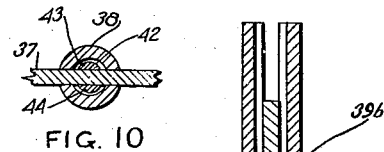
FIG. 10
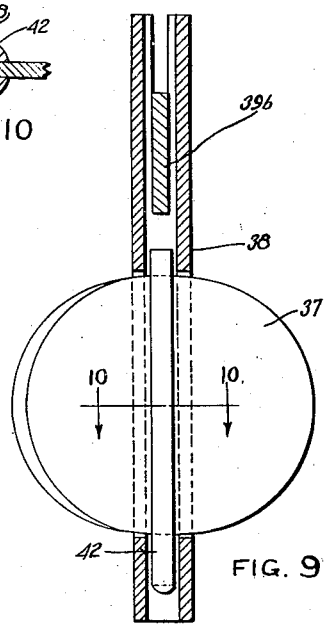
FIG. 9
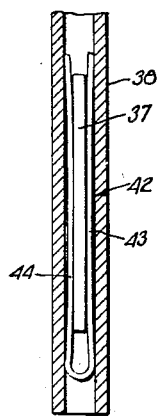
FIG. 11
FIG. 12
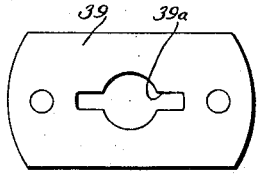
FIG. 13
INVENTOR.
LESTER H. MESSINGER JR
BY John A. Hanrahan
ATTORNEY Patented July 6, 1937

2,085,818

UNITED STATES PATENT OFFICE 2,085,818

ATTACHMENT FOR INTERNAL COMBUSTION ENGINES

Lester H. Messinger, Jr., Trumbull, Conn., assignor to Messinger Devices, Incorporated, Bridgeport, Conn., a corporation of Connecticut Application August 19, 1933, Serial No. 685,852

17 Claims. (Cl. 123—124)

This invention relates to new and useful improvements in internal combustion engines and includes certain improvements in the means disclosed in my co-pending application Serial Number 653,255, filed January 24th, 1933 and in my Patent No. 1,910,350 of May 23, 1933.

The invention includes as an object the providing of means to be applied to an internal combustion engine, particularly an automobile engine, either in the form of an attachment for existing engines or to be built as part of new engines and which will serve to, in a large measure, prevent the formation and discharge of obnoxious or dangerous gases by the engine.

Another object is to provide means which will function to effect a considerable savings in fuel in the operation of an engine.

An additional object is to provide a means which means will serve to prevent dilution of the oil in an engine crank case and will also tend to prevent formation of carbon.

A further object is to provide a means having the characteristics stated and which is automatic in its operation.

Other important objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a side elevational view illustrating an embodiment of the invention as applied to an automobile;

Fig. 2 is a plan view illustrating the application of the invention to a different construction of engine manifold;

Fig. 3 is a view showing the parts of the device uncovered and in their normal relative positions and the view also shows the wiring system;

Fig. 6 is a sectional view taken substantially along the line 6—6 of Fig. 3;

Fig. 7 is a sectional view showing the valve in full lines in its open position and in broken lines in its closed position;

Fig. 8 is a sectional view through the valve operating means;

Fig. 9 is a longitudinal sectional view on an enlarged scale, showing the valve structure;

Fig. 10 is a transverse sectional view taken substantially along the line 10—10 of Fig. 9;

Fig. 11 is a longitudinal sectional view through the valve stem at right angles to Fig. 9 and on an enlarged scale;

Fig. 12 is an elevational view of a valve holding or securing means employed; and Fig. 13 is a plan view of the armature employed.

Figure 4:
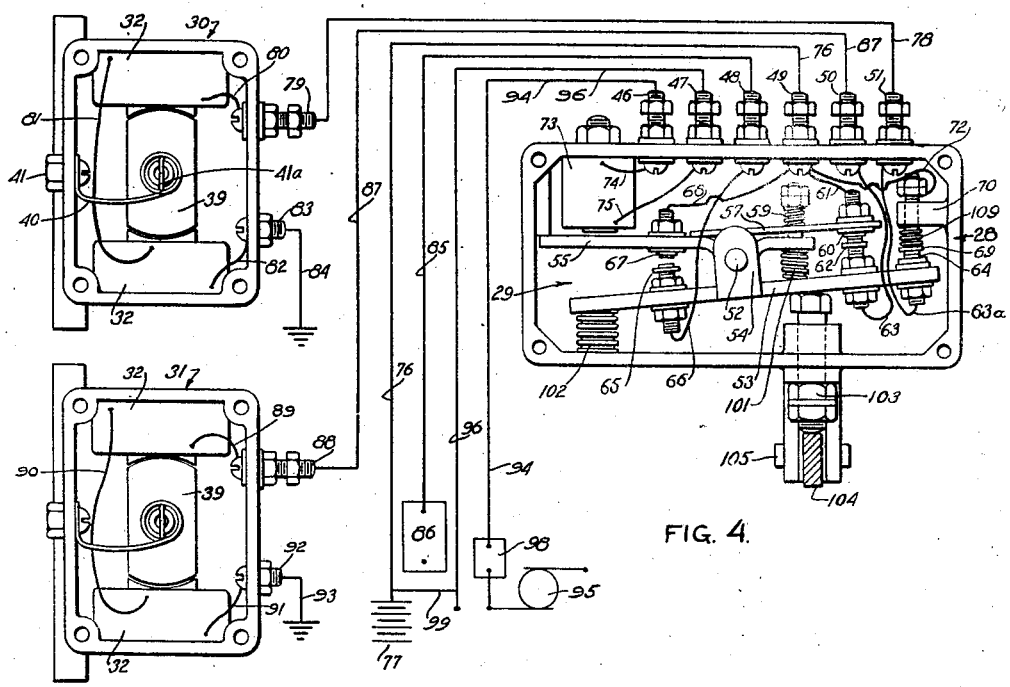
Fig. 4 is a view somewhat similar to Fig. 3 but showing the relative positions of the parts with the throttle valve of the engine closed, the ignition circuit of the engine opened and the air inlet valves of the invention opened.

Referring in detail to the drawings, in Fig. 1 is shown a portion of an automobile including a dash 10 and the usual floor board 11 and in front of the dash there is shown a portion of a motor 12 to which fuel is fed as from carburetors 13 and 14, through intake manifolds 15 and 16. It will be understood that the motor 12 is a multi-cylinder internal combustion engine and may include for example six cylinders three of which are fed through the manifold 15 while the other three are fed through the manifold 16. Of course, the number of cylinders of the engine may vary but the present invention has particular relation to a structure wherein there are a multiplicity of engine cylinders and wherein more than one intake manifold or conduit is utilized so that not all of the cylinders are fed through the same manifold or conduit.

The supply of fuel to the respective manifolds is controlled in the usual manner as by throttle valves, the stems or axes of which are shown at 17 and 18 respectively and which stems or axes are each connected with an operating arm 19, said arms extending to each side of the respective stems and each at one end connected with a spring 20 the tendency of which is to return the respective throttle valves to closed position when moved therefrom. A rod or link 21 connects the other end portions of the arms 19 and also connected with one of said arms is a rod 22 the connection being formed by a pin 23 on the arm and an elongated slot 24 in the end of the rod. At its rearward end, rod 22 is pivotally connected with an accelerator or throttle pedal 25 and a coil spring 26 is anchored at one end to the rod and at its other end to a stationary bracket 27 and serves to return the rod and accelerator pedal to their normal full line positions when advanced or opened as suggested by the broken lines in Fig. 1.

The engine may be either in the form shown or may be of any other desired or conventional construction. It is simply illustrated as a conventional arrangement in order that the construction and operation of the means of the invention may be fully disclosed. Bolted or otherwise secured in any desired position on the automobile as, for example, on the dash 10 is a housing or casing 28 containing a switching mechanism generally designated 29 and a detailed description of the construction and operation of which will later be given.

Mounted on each of the manifolds 15 and 16 are similar housings 30 and 31 each containing a pair of coils 32 of a solenoid magnet arranged within the housing and the cores of said coils are shown at 33 as being secured to the walls of the housings by screws or other suitable means 34. The coils may be held in place about the cores 33 by any suitable or desired means and as here disclosed the cores 33 are slightly tapered and are driven partly into the coils and then drawn into place by tightening of the screws 34. It is to be understood that while the coils of each housing are shown as connected in series they may be connected in parallel. The switching means 29 above referred to controls the respective solenoid magnets as will later more fully appear.

As disclosed in Fig. 1 the housing 30 is mounted on the manifold 15 while the housing 31 is mounted on the manifold 16. In one portion each of said housings is provided with a port 36 through which air will be admitted directly into the manifold on which the housing is mounted, the air being admitted above or independently of the carburetor or other fuel supply means. Arranged in each port or opening 36 is a valve 37 the stem 38 of which extends through the lower end of the housing as best shown in Fig. 8 and the upper end portion of which extends into the space between the magnet coils 32.

To this upper end portion of each stem there is secured a laminated armature 39 adapted to be attracted by the electromagnets and when so attracted adapted to turn the valve stem 38 shifting the valve 37 to open position whereby air will be admitted through the ports 36 to the manifolds independent of the carburetors. In each instance armature 39 is provided with a key hole slot 39a and the upper or outer end of valve stem 38 is slotted in its opposite sides and passed through the armature after which a key 39b is driven into the stem with its wing portions extending through the slots therein. With this arrangement the armature and valve stems are secured together against relative turning movement. A spring 40 above the armature 39 has one of its ends anchored to the housing at 41 and has its other end portion wrapped repeatedly around the upper end portion of the valve stem and secured thereto by passing through the slots in the stem as at 41a. This spring is purposely made of great length so as to exert a constant pressure and the spring tends to retain the valve in closed position and return it to such position when moved therefrom.

Figs. 8 through 12 best illustrate the construction of the valves and as shown the valve stem 38 is hollow or tubular for at least the lower portion of its length and this tubular portion is slotted in its opposite walls for the reception of the valve 37. The valve is substantially oval in shape and has the edges of its end portions arranged at an incline whereby the valve will seat tightly in the port or passage 36 when the valve is in closed position as best shown in Fig. 7. Within the valve stem there is arranged a member 42 somewhat in the shape of a hairpin and preferably bent up from half round wire into the shape shown in Fig. 12. After the valve 37 has been inserted through the slots in the tubular portion of the valve stem 38 this member is driven into the stem through the lower end thereof and the member is arranged with its side arms 43 and 44 embracing the opposite sides of the valve. The said side arms of the member fill the spaces within the stem 38 at the opposite sides of the valve, as best shown in Figs. 10 and 11, and when the member is inserted into the stem the free end portions of its arms are, of course, crowded toward one another so that the member is tensioned with the result that the central portions of its arms in particular will tightly embrace the opposite sides of the valve. This condition is exaggerated in Fig. 11.

With the described arrangement it will be apparent that the valve is not rigidly secured in any particular position in the valve stem but is yieldingly secured in position due to engagement by the arms of the member 42. Therefore, the valve may be shifted in or through the stem 38 and it will therefore seek or work into a smooth and tight fit against the walls of the port.

Mounted on the housing 28 or otherwise suitably located are six binding posts 46, 47, 48, 49, 50 and 51. These binding posts are insulated from the housing and from each other. Within the housing is a shaft 52 on which is pivotally mounted a plate-like member 53 having up-turned ears 54 pivotally connecting the member with the bar or shaft 52. Also, within the housing and pivotally mounted on shaft 52 is a second plate-like member or armature 55 bent or off-set intermediate its ends as at 56 (see Fig. 5), this off-set intermediate portion embracing the bar or shaft.

A member 57 has a portion disposed between the upper ends of the ears 54 and extends over the off-set portion 56 of member 55 and beyond one end of said member. A short stud or bolt 58 is carried by the inner end portion of member 55 and extends upwardly therefrom and through an opening in the member 57. On said stud above said member is a coil spring 59 whereby the member 57 may move upwardly with respect to the member 55 as suggested in Fig. 4, the bolt 58 together with the ears 54 guiding such upward movement so that there is no lateral movement of member 57 on or with respect to member 55.

The member 57 carries a contact element 60 connected with the binding post 49 as by a wire 61 and the plate-like member 53 carries a contact element 62 connected with the binding post 50 as by a wire 63. Further, plate-like member 53 carries a contact 64 connected with the binding post 51 by a wire 63a. In addition, a contact member 65 is carried by the pivoted plate-like member 53 and this contact member 65 is connected with the binding post 48 as by a wire 66 and the armature or plate-like member 55 carries a contact member 67 connected with the binding post 49 by a wire 68. A contact 69 is mounted by and insulated from a lug 70 which may be cast with the housing 28 and such contact 69 is connected with the binding post 49 by a lead wire 72.

Within one end portion of housing 28 there is arranged an electromagnet 73, the coil of which is connected with the binding posts 46 and 47 by wires 74 and 75 respectively.

A lead 76 connects the binding post 49 with the positive side of a battery 77 and a lead 78 connects binding post 51 with a binding post 79 on the housing 30, and which binding post 79 is connected with one of the coils 32 as by a wire 80, the coils of housing 30 are connected together by a wire 81 and the lead from coils is shown at 82 connected with a binding post 83 from which a lead 84 extends to a ground. From binding post 48 a lead 85 extends to the ignition coil 86 of the automobile. A lead 87 extends from the binding post 50 to a binding post 88 on the housing 31 and binding post 88 is connected with one of the solenoid coils 32 of said housing by a wire 89 while the two coils of the housing are connected together by a wire 90. The lead from the coils is shown at 91 and connects with a binding post 92 from which a lead 93 extends to a ground.

A lead 94 from any or the usual automobile generator 95 is connected with the binding post 46 and a lead 96 from the binding post 47 is connected with a voltage regulator and cut-out 97 and then to the battery by a lead 100 (see Fig. 3) while in Fig. 4 a cut-out 98 is shown in the line 94 and the line 96 is connected with the battery 77 by a lead 99. In some automobiles, particularly trucks and busses, the arrangement of Fig. 3 is used while the arrangement of Fig. 4 would be used in automobiles not equipped with the voltage regulator.

Members 53 and 55 are mounted for pivotal movement together and relatively about the short shaft 52. To one side of said shaft a coil spring 101 is interposed between the members and in its opposite end portions this spring receives oppositely extending short projections or nubs carried by the members, one of such nubs being formed by the head of bolt 58. Obviously, the normal tendency of spring 101 is to move the members 53 and 55 apart in a direction to separate the contacts 60 and 62 and the contacts 64 and 69. A coil spring 102 is arranged between the other end portion of member 53 and a wall of the housing 28 and this spring 102 prevents the members 53 and 55 pivoting freely around the shaft 52 in a direction to bring the contact 60 into engagement with the upper wall of the housing and to prevent the contact 65 or the end portion of the member 53 coming into engagement with the lower wall of the housing.

Extending through a wall of the housing in alignment with one end portion of the plate-like member 53 is a push rod or member 103 disclosed as in the form of a bolt. This push rod is slidable through the wall of the housing and normally is disposed with its inner end portion in spaced relation to the plate-like member 53. A bell crank 104 is arranged at the outer side of the housing being pivotally mounted as at 105 and connected at one end to an end of this bell crank is a rod 106, the said rod at its other end being connected to the throttle operating rod 22 as at 107.

When the throttle lever 25 is depressed, the valves 37 in the ports 36 are closed before the throttles are open so that there is no change in the operation of the engine when under load. This is true since owing to the lost motion connection at 23, 24 the push rod 103 is permitted to move out of the casing and release the arm 53 prior to the opening of the throttle valves. As long as the engine is operated at a speed sufficient to drive the generator 95 at charging speed the electromagnet 73 is energized and it attracts the end portion of the member 55, which end portion forms an armature, and the switch parts are held in the positions in which they are shown in Fig. 3.

It will be noted in Fig. 3 that the contact members 65 and 67 are in engagement and that the circuit between the ignition means of the engine and the battery is closed. Further, it will be noted that the contacts 60 and 62 and the contacts 64 and 69 are spaced apart so that the circuits to the coils of the respective housings 30 and 31 are open. Therefore, the engine is operating in the usual manner with opened throttle. If the throttle mechanism is now released or closed while the engine maintains the predetermined speed as, for example, if the automobile is coasting in gear and the engine is operating above a predetermined speed as when the wheels are driving the engine, the bell crank 104 engages and pushes the rod 103 inwardly and said rod engages an end portion of the plate-like member 53 rocking said member about the shaft 52 in opposition to the action of springs 101 and 102, shifting the switch parts into the positions in which they are shown in Fig. 4.

Since the plate-like member or armature 55 is being held against movement by the charged magnet 73 rocking of the member 53 will first serve to separate the contact members 65 and 67 opening the ignition circuit of the engine and immediately thereafter the contact members 60 and 62 and the contact members 64 and 69 are brought into engagement closing the circuits to the coils 32 of the respective housings 30 and 31 with the result that the armatures 39 are attracted and against the action of springs 40 the valves 37 are swung to open positions. This admits air to the manifolds independent of the carburetors and relieves any vacuum in the vertical or riser portions of the manifolds and accordingly any vacuum on the carburetors. Therefore, fuel will not be drawn into the engine and since the ports 36 are relatively large plenty of air will be supplied to the various cylinders of the engine and there will be a free intake and exhaust of air by the engine.

No appreciable amount of vacuum is necessary to take air into the engine through the ports 36 and the opening of the valves 37 gives a coasting effect, as the pistons of the engine do not have to work against vacuum. However, the engine remains connected with the wheels of the vehicle and such coasting effect is obtained without the dangers incident to the uncontrolled action of the vehicle wheels when uncoupled from the engine. Since with the valves 37 open, air and not fuel is drawn into the engine a considerable savings in fuel results. By means of the present invention this saving of fuel is augmented when the engine is idling, as will later be described.

Should the speed of the engine drop below that necessary to drive the generator 95 at a charging speed (in the neighborhood of fifteen miles per hour) the magnet 73 will not be energized and will release the plate-like member or armature 55 with the result that the same will rock about the shaft 52 in a direction to bring contact 67 into engagement with contact 65 thereby closing the ignition circuit and carrying the contact 60 out of engagement with the contact 62 opening the circuit to the coils 32 of the housing 31 (see Fig. 5). It is to be noted that under these conditions the contacts 64 and 69 remain in engagement so that the coils 32 of housing 30 remain energized whereby the valve 37 controlled by such coils remains open and the valve of the housing 31 will be closed due to the action of spring 40. That is when the engine drops to idling speed but one valve 37 closes, the other remaining open as long as the throttle remains closed.

Figure 5:
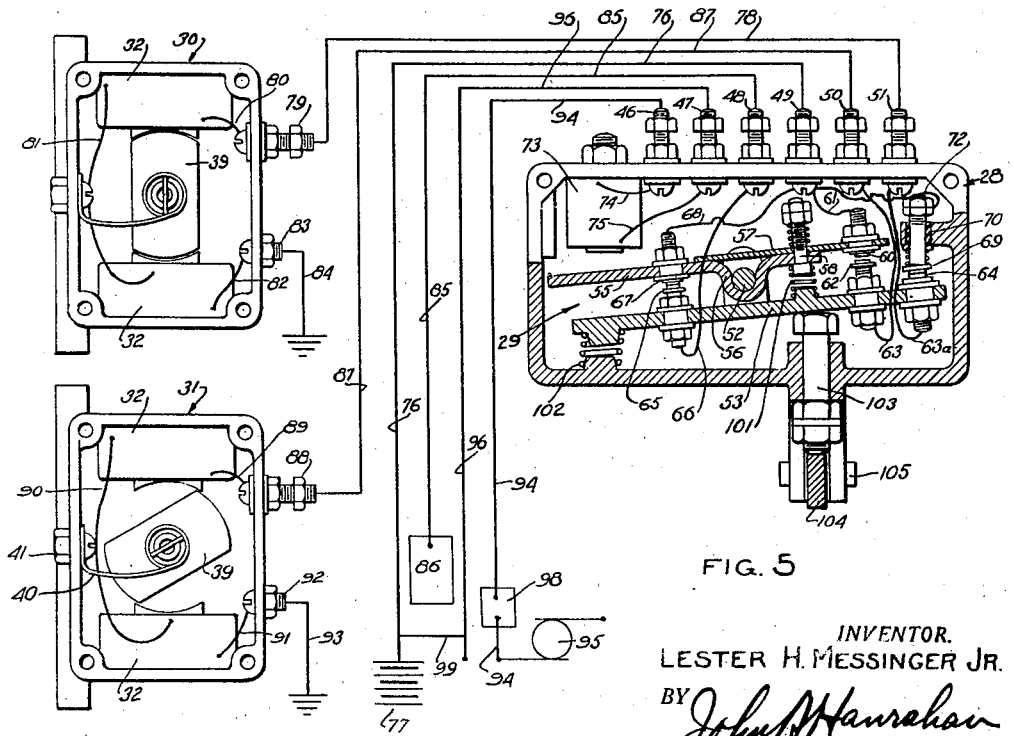
Fig. 5 is a somewhat similar view showing the relationship of the parts when the automobile throttle is closed and one of the air valves is open the other is closed and the engine is idling with only half its cylinders in operation.

Fig. 5 shows the parts in this last described position and from said figure it will be noted that the ignition circuit is closed and that one of the valves 37 is in open position while the other is in closed position so that when the engine idles a charge is being drawn into only a portion of the cylinders of the engine as for example one-half of such cylinders. Into the remaining cylinders air is being drawn through an open port 36. It is understood that while an engine is idling a relatively rich mixture is drawn into the cylinders and is only partially consumed with the result that a large volume of obnoxious and poisonous gas is exhausted by the engine.

With the present arrangement but one-half of the cylinders of the engine are operating when the engine is idling and a considerable savings in fuel therefore results. This fuel is more thoroughly consumed and the gases exhausted by the working cylinders are discharged into the same exhaust pipe as the air which is discharged by the remaining cylinders of the engine so that the said exhaust gases are very much diluted. Therefore, in addition to saving fuel and reducing the volume of exhaust gases discharged by the engine the present invention provides means for diluting such gases prior to their discharge from the exhaust pipe of the automobile.

Fig. 3 of the drawings shows the relative positions of the switch parts when the engine is operating under load or under opened throttle. Fig. 4 shows the parts in the positions occupied by them when the engine is being driven above a predetermined speed with the throttle closed, as when the engine is being driven by the wheels of a vehicle, and it will be noted in this figure that the ignition circuit of the engine is open and that the circuits to the magnets controlling the two valves 37 are closed so that both of said valves are open. This condition also prevails when the engine is racing with the clutch out as when shifting gears. Fig. 5 shows the parts in the positions occupied by them when the engine is idling. When the engine is idling the contacts 65 and 67 are in engagement and the ignition circuit is closed and contacts 60 and 62 are separated whereby one of the valves 37 is closed and contacts 64 and 69 are in engagement and the other valve 37 is open.

While the parts are in the positions shown in Fig. 4, that is, with the ignition circuit open, the throttle mechanism closed and the valves 37 both open, should the throttle mechanism be opened the bell crank 104 will be carried away from the push rod 103 and the latter will move out of the housing 28 permitting the parts to return to the position in which they are shown in Fig. 3. It is to be understood that when the throttle is opened the engine will be speeded up so that the generator will be operating at charging speed, and the magnet 73 will be energized. When the parts are positioned as in Fig. 5 (with the engine idling) should the throttle mechanism be opened push rod 103 will drop away from the plate-like member 53 or will be pushed outwardly by the springs 101 and 102 acting through said member.

Under these circumstances, the contact 62 will remain out of engagement with the contact 60 and the contact 64 will be moved away from the contact 69 so that the parts will be returned to the positions of Fig. 3, it being understood that when the throttle is opened the speed of the engine is increased to drive the generator at a charging speed.

Owing to the mounting of the contact carrying member 57 the push rod 103 may operate to rock the plate-like member 53 and bring contact 62 into engagement with contact 60 without applying sufficient pressure to the armature or plate member 55 to force said member away from the magnet 73. That is, when the contact 62 engages the contact 60 it may push the same upwardly slightly compressing spring 59 as indicated in Fig. 4 of the drawings. Contact 69 is likewise yieldingly mounted, being held in its extended position of Fig. 3 as by a coil spring 109 surrounding its stem and adapted to be compressed when the contact is engaged as in Figs. 4 and 5.

From the foregoing it will be understood that with the present invention the valves 37 will open whenever the throttle mechanism is closed and the engine is operating above a predetermined speed. This may occur when the automobile is coasting while in gear or when the throttle is opened and then suddenly released the engine racing as when shifting gears. Further, it will be understood that irrespective of engine speed one of the valves 37 is opened whenever the throttle is closed and that when the engine is idling but a portion of its cylinders are working in the usual manner since only one of the valves 37 closes when the engine drops below a predetermined speed. In the present disclosure it is the valve associated with housing 30 which remains open when the engine drops to idling speed. This valve closes immediately the throttle is opened since this permits of the push rod 103 moving outwardly or dropping away from the member 53. It will, therefore, be appreciated that the device is automatic in its operation and requires no special attention on the part of the operator and that the device will not cause stalling of the engine when the latter is operating at low speed.

Since the device operates to prevent fuel being drawn into the engine when the automobile is coasting a savings in fuel results and this savings in fuel is augmented by the fact that when the engine is idling fuel is being drawn into only a portion of the cylinders as, for example, one half of the cylinders of the engine. When an engine is operating at high speed with a closed throttle should the valves 37 be closed or not be provided, large quantities of fuel would be drawn into the engine cylinders making a poor mixture which would not burn fully with the result that dangerous gases would be discharged through the exhaust pipe. With the present device, this is largely prevented.

Further, with the present device the dilution of the oil in the crank case is lessened or eliminated since no high vacuum is formed in the crank case to draw gasoline down between the engine pistons and the walls of the cylinders. Attention is also directed to the fact that the coils 32 operate off the battery 77 and the valve operating mechanism including the coils do not have to be built to carry the variations in generated currents. This generator current passes through the coil 73 which is designed to accommodate the fluctuating current.

In connection with the operating of the device it will be noted that the most usual movement of the parts is from the positions of Fig. 3 to the positions of Fig. 4 on closing of the throttle. In Fig. 4 the magnet 73 is energized and the contacts 65 and 67 are spaced so that the ignition circuit is open. Further, the contacts 60 and 62 and 64 and 69 are in engagement so that the circuits to the actuating means for the valves 37 are closed. Now, if the charging rate of the generator drops the parts will move into the relative positions in which they are shown in Fig. 5 and the circuits will be more or less reversed. That is, the ignition circuit will be closed and the circuit to the coils 32 of the housing 31 will be opened so that one valve 37 will close and the engine will idle with but a portion of its cylinders working.

When the parts are positioned as in Fig. 5 should the charging rate of the generator increase magnet 73 will be energized and attract arm 55 and the parts will be drawn into the relative positions in which they are shown in Fig. 4. That is, when the parts are as shown in Fig. 5 should the engine be speeded up without depressing the accelerator pedal, as when the automobile starts down a grade, magnet 73 will be energized and attract arm 55 and the ignition circuit would be opened and the circuits to the various coils 32 closed so that the valves 37 will be opened. However, should the throttle be opened when the parts are positioned as shown in either Fig. 4 or Fig. 5 the parts would shift into the positions in which they are shown in Fig. 3 and both of the valves would be closed. This last shifting operation would take place due to outward movement of the push rod 103 and due to the fact that the generator speed would be increased to charging speed.

In Fig. 2 is shown a somewhat different manifold construction and in that figure a pair of intake passages 110 and 111 are shown as formed in a single casting, the passages being fed either from the same or separate carburetors (not shown) through risers 112. With this arrangement of manifold the four intermediate cylinders of an eight cylinder engine are fed through the passage or manifold 111 while the two end cylinders at each end of the engine block are fed through the passage or manifold 110. With this arrangement the casing or housing 30 may be mounted to supply air through its port 36 to the manifold 111 while the casing or housing 31 may be arranged to, at the proper times, supply air to the manifold 110. Of course, the casings may be reversed and the arrangement may be such that the four inner cylinders operate when the engine is idling.

From the foregoing it will be understood that the principles of the invention may be utilized in engines having various constructions of intake manifolds. It will be also understood that the invention is not limited to use with engines of any particular multiple of cylinders and that the invention may be applied to any engine wherein all of the cylinders are not fed through the same passages. That is, the invention might be applied to an engine having four intake manifolds one valve being mounted in each manifold and the arrangement being such that one or more valves open whenever the throttle is closed, the other valve or valves opening on closing of the throttle when the engine is operating over predetermined speed. Various other applications of the invention will readily suggest themselves to those skilled in the art.

Having thus set forth the nature of my invention, what I claim is:

1. In a multi-cylinder internal combustion engine, a plurality of fuel inlets each leading to different cylinders of the engine, throttle means controlling the feed of fuel to the engine, means to stop the flow of fuel through one of said inlets whenever said throttle means is closed, mechanism to stop the flow of fuel through another of said inlets when the engine speed exceeds a predetermined value with closed throttle means, and means to open each of said inlets when the throttle means is open wider than idling position.

2. In combination with a multi-cylinder internal combustion engine including a pair of intake manifolds each arranged to convey fuel to different cylinders of said engine, each of said manifolds having an air port, means to open both of said air ports when the engine is operating under forced momentum instead of under load, and automatically operable means, brought into operation by the engine dropping below a predetermined speed, to close one of said ports.

3. In combination with a multi-cylinder internal combustion engine including a pair of intake manifolds each arranged to convey fuel to different cylinders of said engine and a throttle means for controlling the feed of fuel to the engine cylinders, each of said manifolds having an air port, means to open both of said air ports when the engine is operating above predetermined speed with said throttle means closed, and means to close one of said ports while the other remains open when such speed falls below said predetermined speed while said throttle means is closed.

4. In combination with a multi-cylinder internal combustion engine, a conduit for conveying fuel to certain of the cylinders of said engine and a throttle means for controlling the feed of fuel to the engine cylinders, a second conduit for conveying fuel to other cylinders of said engine, a pair of means associated one with each of said conduits for stopping the flow of fuel therethrough to the engine when the engine throttle is moved to closing position and the engine is operating above a predetermined speed, means for automatically rendering only one of said means inactive when the engine speed drops to idling speed, and means for thereafter automatically rendering the other of said means inactive when the engine throttle is again moved toward open position.

5. In combination with a multi-cylinder internal combustion engine, a pair of intake manifolds each arranged to convey fuel to different cylinders of said engine and a throttle means for controlling the feed of fuel to the engine cylinders, each of said manifolds having an air port, means to open both of said air ports when the engine is operating above predetermined speed with said throttle means closed, means to close one of said ports while the other remains open when such speed falls below said predetermined speed while said throttle means is closed, and means for thereafter automatically closing the other of said ports when the engine throttle is again moved toward open position.

6. In combination with a multi-cylinder internal combustion engine including a pair of fuel intake manifolds of which one is arranged to deliver fuel to a portion of the cylinders of the engine while the other is arranged to deliver fuel to other cylinders of the engine, means for supplying fuel to said manifolds, throttle means to control the feed of fuel to said manifolds, one of said manifolds having an air port, a valve controlling said air port, means for moving said valve to closed position when said throttle means is moved toward open position, means for moving said valve to open position whenever said throttle means is moved to closed position; and said throttle means including a lost motion means whereby said valve is moved to closed position on initial movement of said throttle means toward open position and before said throttle means starts to open.

7. In combination with a multi-cylinder internal combustion engine including a pair of fuel intake manifolds of which one is arranged to deliver fuel to a portion of the cylinders of the engine while the other is arranged to deliver fuel to other cylinders of the engine, means for supplying fuel to said manifolds, throttle means to control the feed of fuel to said manifolds, means for stopping the flow of fuel to the engine cylinders fed through one of said manifolds whenever the throttle means is moved to closed position, means whereby the means for stopping the flow of fuel is rendered inactive when said throttle means is moved toward open position, and said throttle means including a lost motion means whereby the means for stopping the flow of fuel is rendered inactive as the throttle is moved toward but before it reaches an open position.

8. In combination with a multi-cylinder internal combustion engine including a fuel supply means and a pair of intake manifolds each arranged to convey fuel from said means to different cylinders of the engine, each of said manifolds having an air port, means to open one of said air ports whenever the throttle is closed, and means to open the other of said ports only when the engine is operating under forced momentum instead of under load.

9. In combination with a multi-cylinder internal combustion engine, a conduit for conveying fuel to certain of the cylinders of said engine, a second conduit for conveying fuel to other cylinders of the engine, a throttle means controlling the feed of fuel to the engine, a throttle lever controlling said throttle means, throttle lever controlled means for stopping the flow of fuel to the engine through one of said conduits whenever the engine throttle lever is moved to closed throttle position, and throttle lever controlled means for stopping the flow of fuel to the engine through the other of said conduits only when the throttle lever is moved to closed throttle position and the engine is operating above a predetermined speed.

10. In combination with a multi-cylinder internal combustion engine, a conduit for conveying fuel to certain of the cylinders of said engine, a second conduit for conveying fuel to other cylinders of the engine, throttle means controlling the feed of fuel to said conduits, a throttle lever controlling said throttle means, throttle lever controlled means for stopping the flow of fuel to the engine through one of said conduits whenever the throttle lever is moved to closed throttle position, means for stopping the flow of fuel to the engine through the other of said conduits only when the throttle lever is moved to closed throttle position and the engine is operating above a predetermined speed, and means for rendering both of said means inactive when the throttle lever is moved toward open throttle position.

11. In a multi-cylinder internal combustion engine, a plurality of intake manifolds each leading to different cylinders of said engine, a throttle and throttle actuating means, an air inlet means in each of said manifolds, mechanism to move one of said air inlet means to open position whenever said throttle is closed, mechanism to move another of said air inlet means to open position when the engine speed exceeds a predetermined value with closed throttle, and means to close each of said air inlet means when the throttle is open wider than idling position.

12. In a multi-cylinder internal combustion engine, a plurality of intake manifolds each leading to different cylinders of said engine, a throttle and throttle actuating means, an air inlet means in each of said manifolds, mechanism to move one of said air inlet means to open position whenever said throttle is closed, and mechanism to move another of said air inlet means to open position when the engine speed exceeds a predetermined value with closed throttle.

13. In combination with a multi-cylinder internal combustion engine, a conduit for conveying fuel to certain of the cylinders of said engine, a second conduit for conveying fuel to the other cylinders of the engine, throttle lever means controlling the feed of fuel to the engine cylinders, a pair of valves associated one with each of said conduits and operable to stop the flow of fuel therethrough to the engine, means controlled by the throttle lever means to cause said valves to be so operated when the throttle lever means is moved to throttle closing position and the engine is operating above a predetermined speed, and means for rendering one of said valves inoperative while the other remains operative when the engine reaches idling speed.

14. In a multi-cylinder internal combustion engine including throttle means and a throttle actuating means, a plurality of air inlet means associated with different cylinders of the engine to admit air to them, mechanism to move one of said air inlet means to open position whenever the throttle actuating means is in closed throttle position, mechanism to move another of said air inlet means to open position when the engine speed exceeds a predetermined value with said actuating means in closed throttle position, and means to close each of said air inlet means when the throttle actuating means is in advance of idling position.

15. In a multi-cylinder internal combustion engine including throttle means and throttle actuating means, a plurality of air inlet means associated with different cylinders of the engine to admit air to them, mechanism to move one of said air inlet means to open position whenever the throttle actuating means is in closed throttle position, and mechanism to move another of said air inlet means to open position when the engine speed exceeds a predetermined value with said actuating means in closed throttle position.

16. In a multi-cylinder internal combustion engine including throttle means and throttle actuating means, mechanism to stop the flow of fuel to one of the engine cylinders whenever the throttle actuating means is in closed throttle position, mechanism to stop the flow of fuel to another of the engine cylinders when the engine speed exceeds a predetermined value with said actuating means in closed throttle position, and means to render each of said mechanisms inactive when the throttle actuating means is in advance of closed throttle position.

17. In a multi-cylinder internal combustion engine including throttle means and throttle actuating means, mechanism to stop the flow of fuel to one of the engine cylinders whenever the throttle actuating means is in closed throttle position, and mechanism to stop the flow of fuel to another of the engine cylinders when the engine speed exceeds a predetermined value with said actuating means in closed throttle position.

LESTER H. MESSINGER, Jr.